July 19, 1932. R. W. JANDA 1,867,839
IRONING MACHINE
Filed Sept. 26, 1930 10 Sheets-Sheet 2
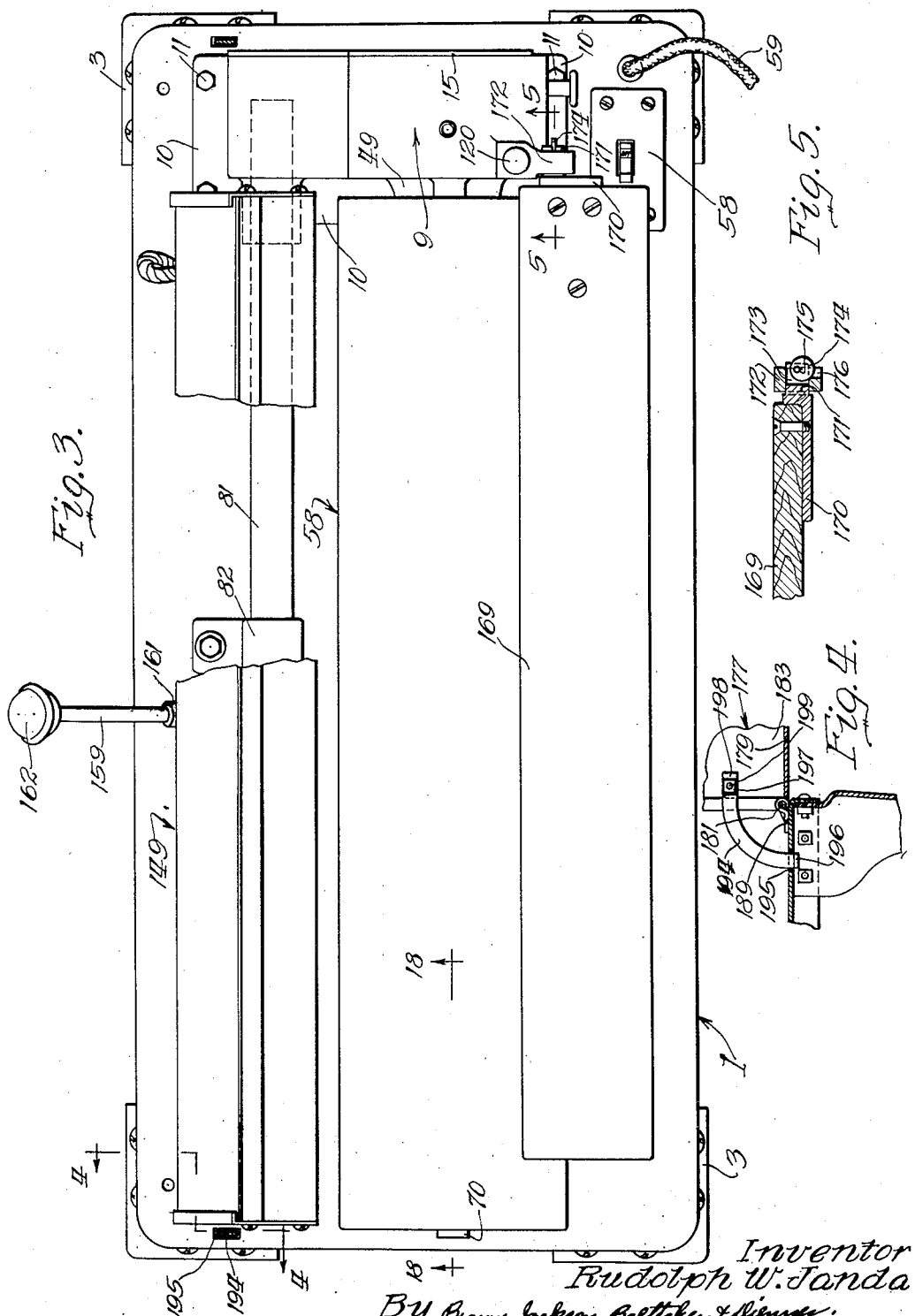
Inventor
Rudolph W. Janda

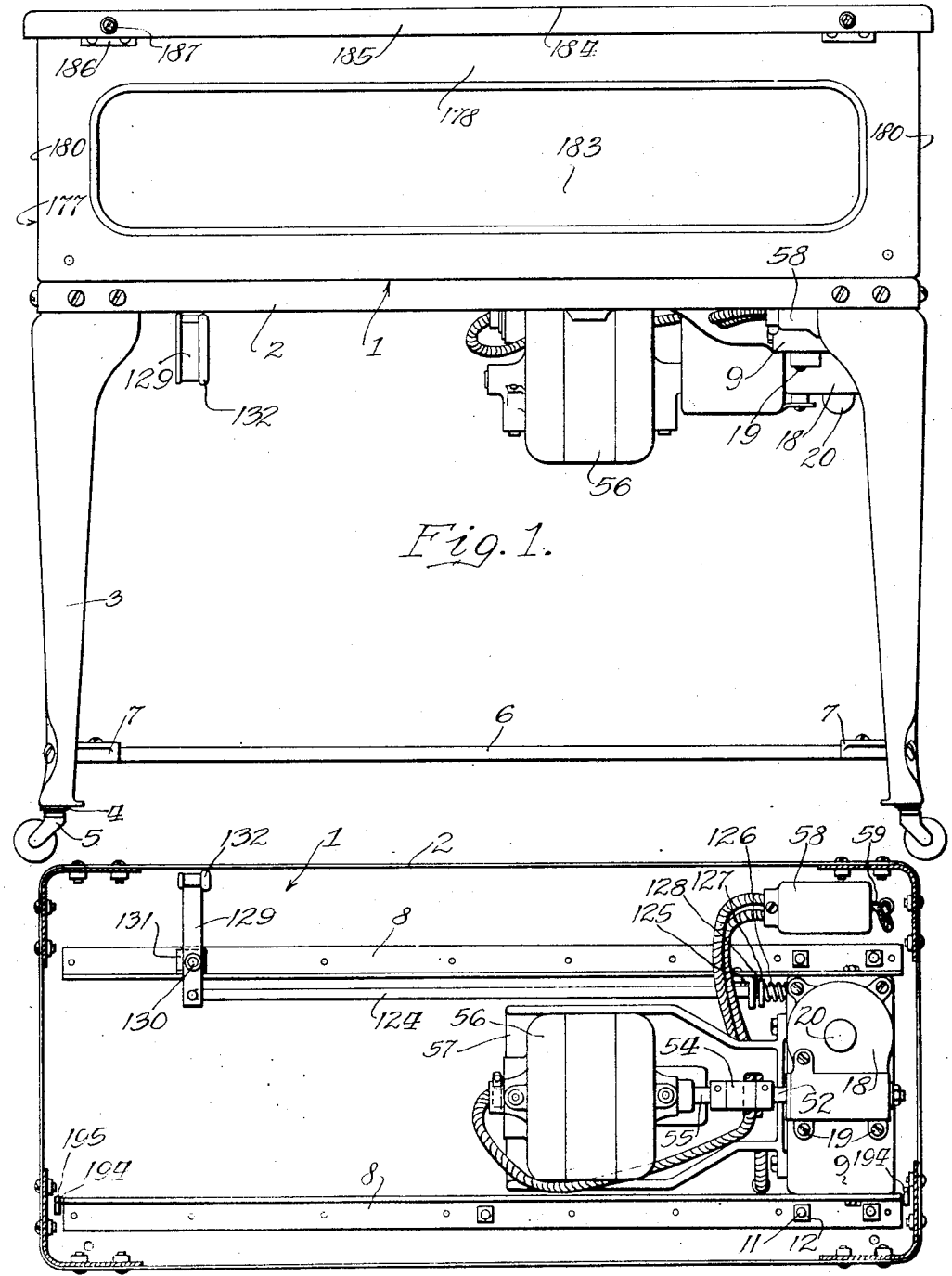

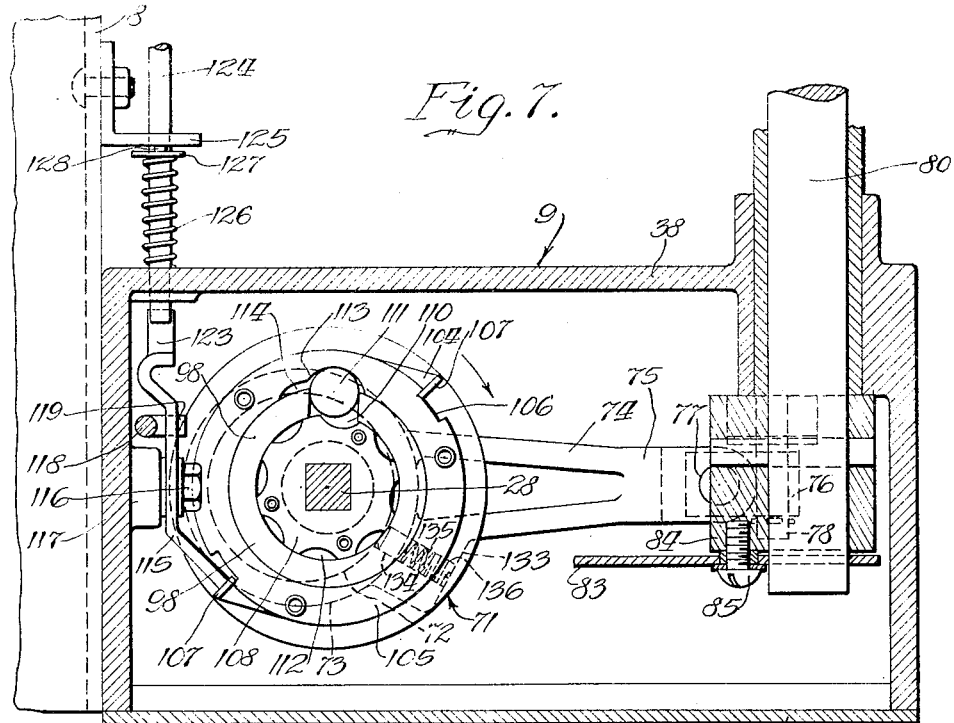
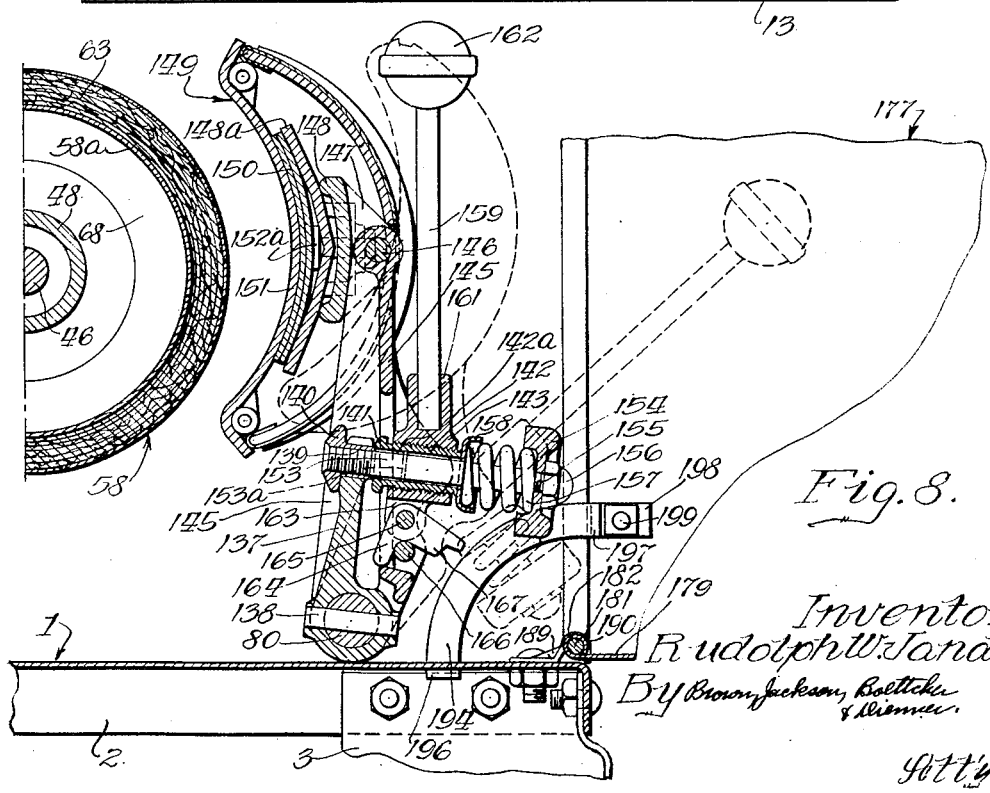

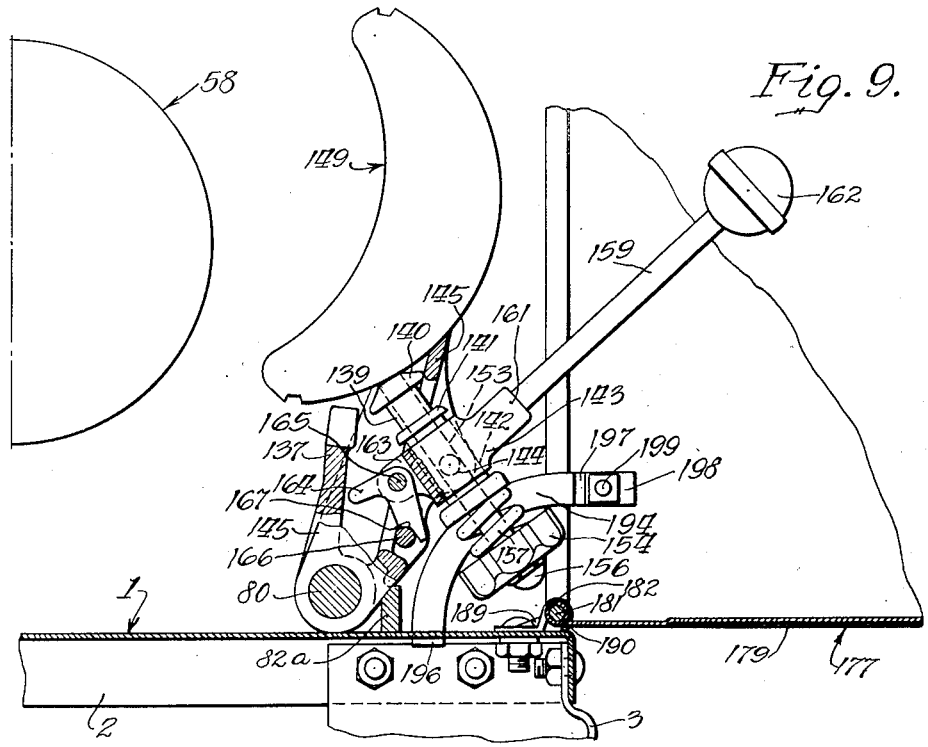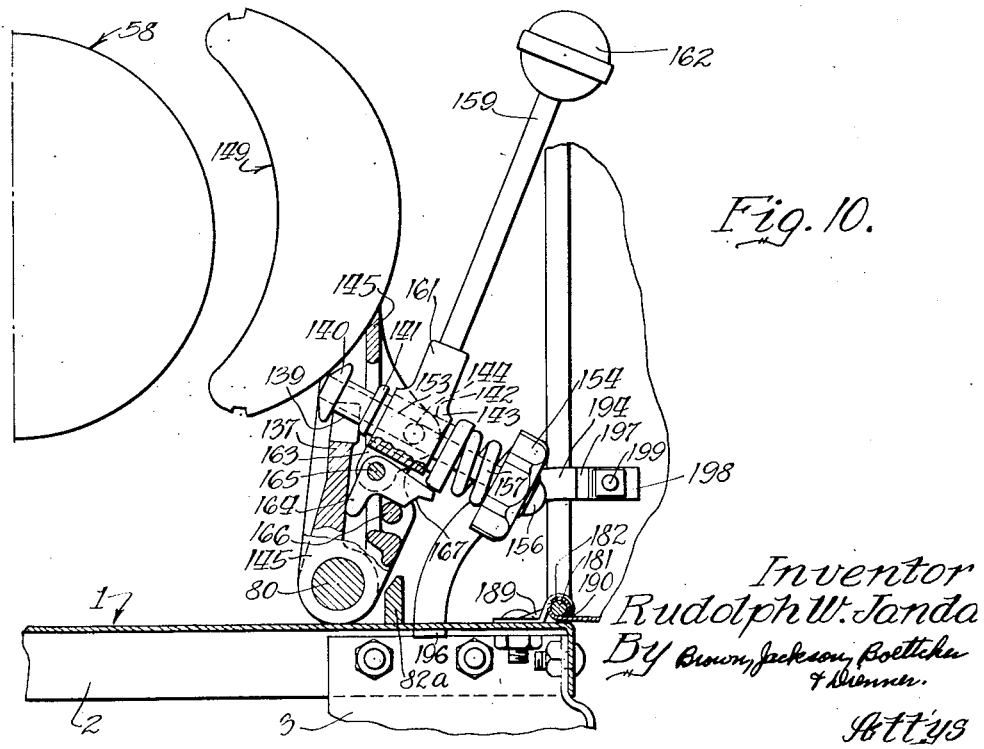

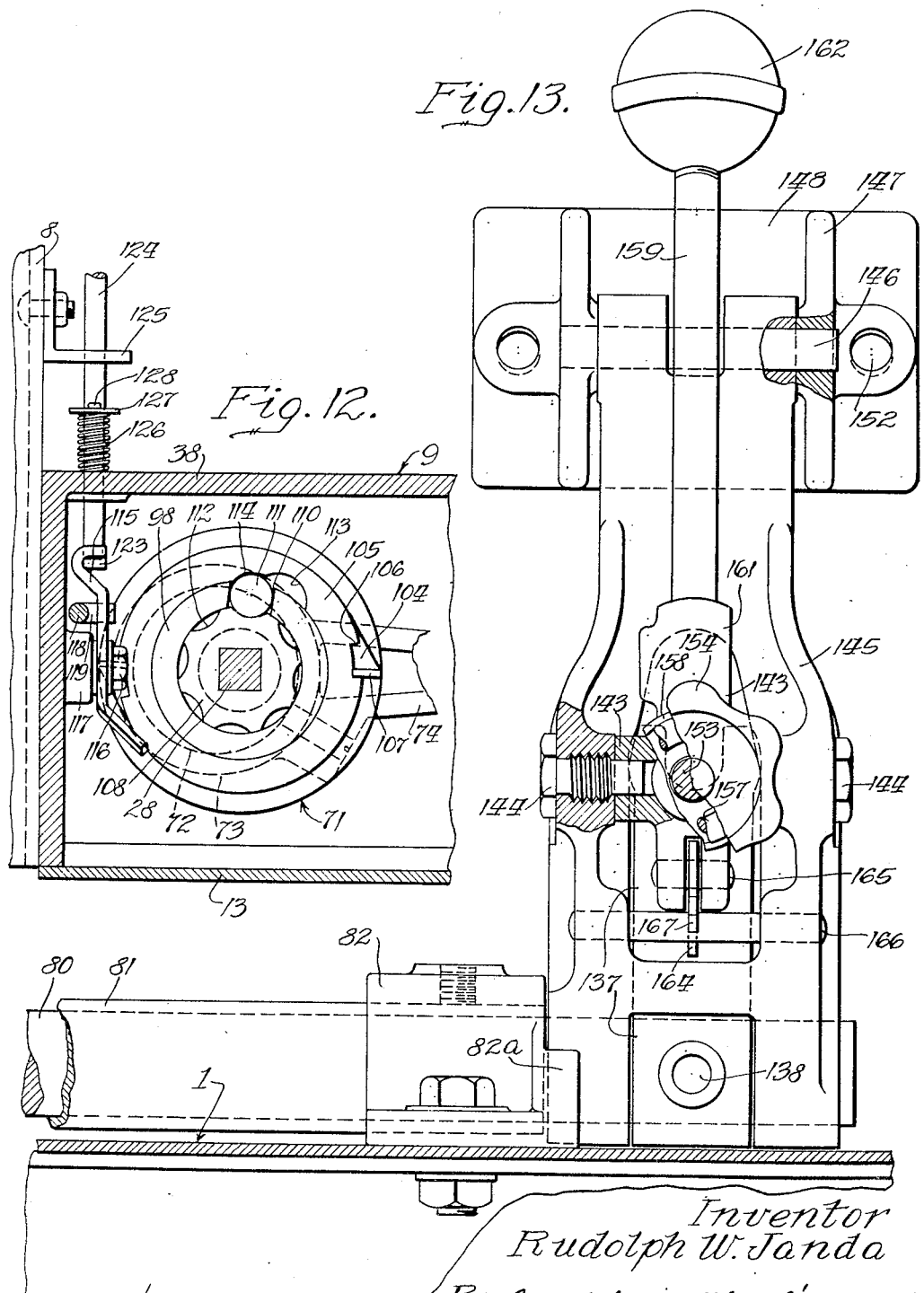

Inventor
Rudolph W. Janda

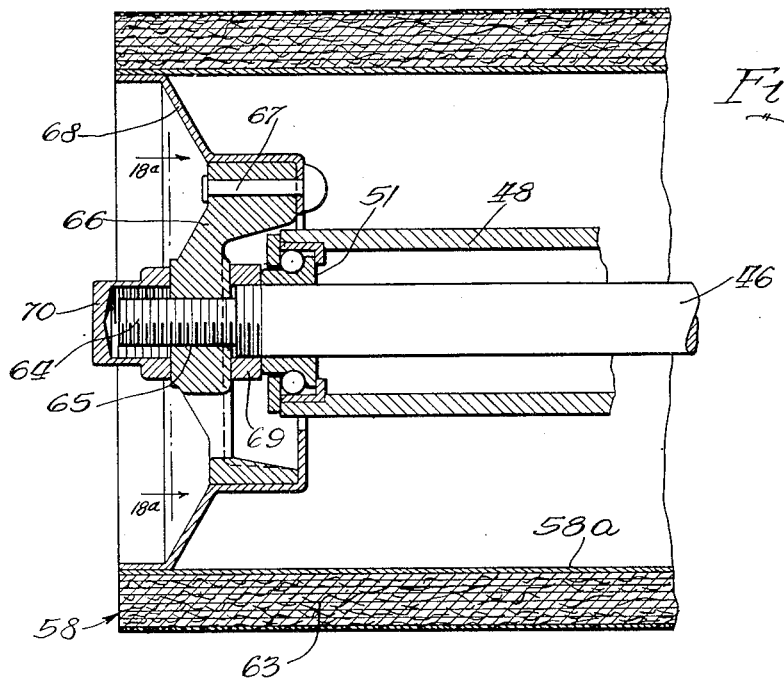
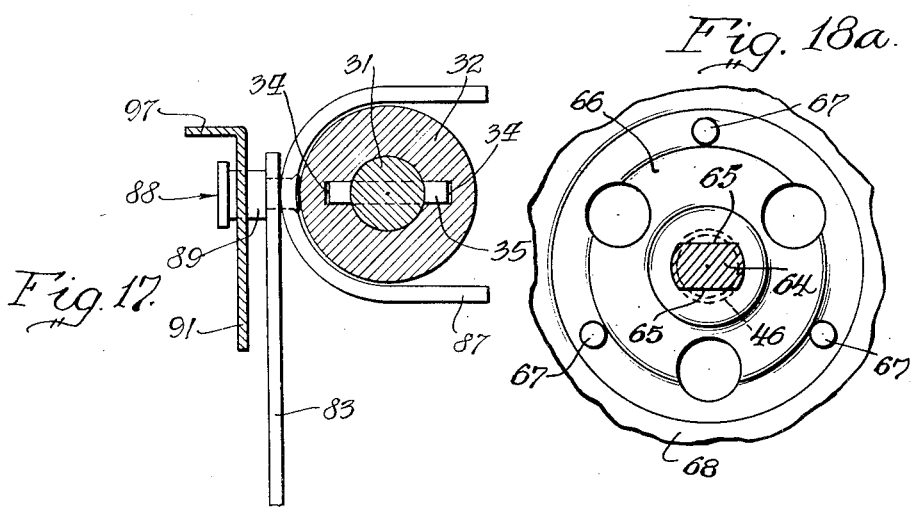

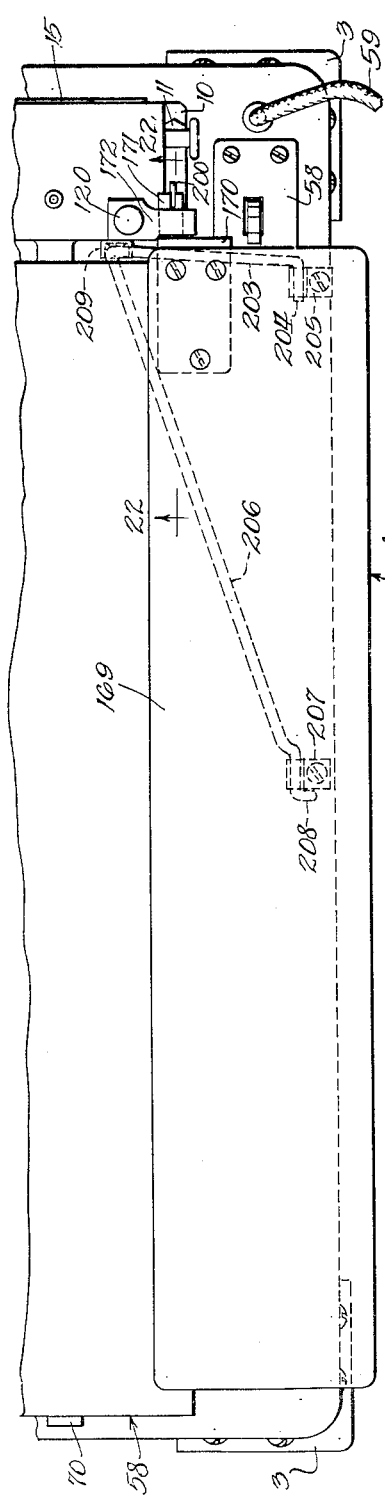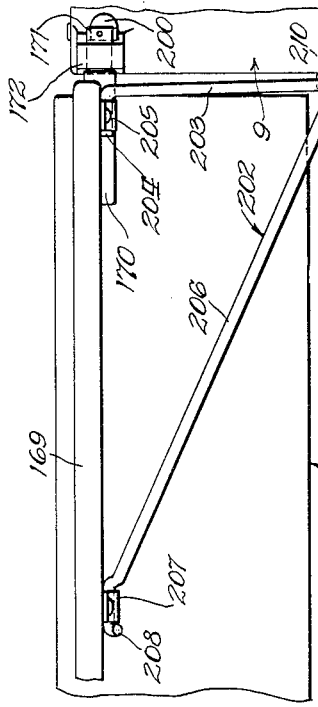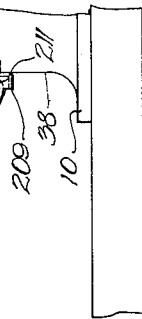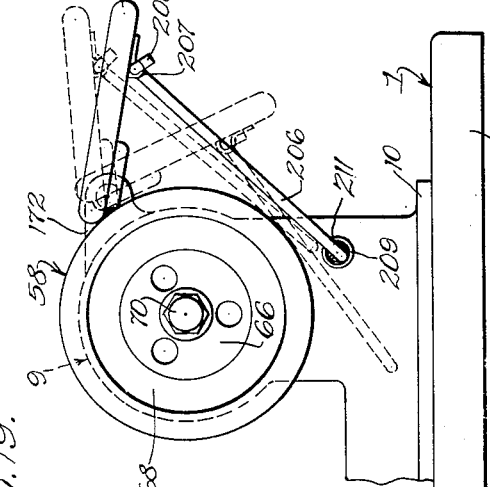

Patented July 19, 1932

1,867,839

UNITED STATES PATENT OFFICE

RUDOLPH W. JANDA, OF BERWYN, ILLINOIS, ASSIGNOR TO CONLON CORPORATION, OF CICERO, ILLINOIS, A CORPORATION OF ILLINOIS

IRONING MACHINE

Application filed September 26, 1930. Serial No. 484,542.

This invention relates to ironing machines, and more particularly to machines of this character intended for domestic use.

In the Patent, No. 1,656,656, dated January 17, 1928, to Carl F. Anderson and Rudolph W. Janda, for ironing machine, there is disclosed an ironing machine in which an ironing shoe is moved toward and away from a rotating roll, into and out of operative relation thereto, there being a box cover hinged to the bed structure of the machine and movable into position to cover the ironing mechanism, this cover, when open, occupying a position alongside the hot shoe in parallel relation thereto and serving as a guard therefor. My invention has to do more particularly with a machine of this type, one of the main objects of my invention being to provide improved means for operating the shoe for moving it toward and away from the roll.

Another object of my invention is to provide improved means for connecting the shoe supporting arm to the shoe operating arm secured on the shoe operating shaft, this means being adjustable to provide variable spring pressure exerted by the shoe upon articles passed between the same and the roll in the ironing operation. A further object is to provide improved means for supporting and driving the roll. It is also an object of my invention to simplify and improve the general construction of the machine as a whole. Further objects and advantages of my invention will appear from the detailed description.

In the drawings:

Figure 1 is a front view of the ironing machine with the cover closed;

Figure 2 is an underneath view of the bed plate and associated parts;

Figure 3 is a plan view of the ironing machine with the cover removed and parts broken away;

Figure 4 is a detail view of one of the stops for the cover, the bed plate and the cover being shown fragmentarily and in section;

Figure 5 is a section taken substantially on line 5—5 of Figure 3;

Figure 7 is a section taken substantially on line 7—7 of Figure 6;

Figure 8 is a vertical sectional view through the shoe operating shaft and arm and associated parts, parts being shown in elevation and the shoe arm being operatively connected to the arm on the operating shaft;

Figure 9 is a view similar to Figure 8 but showing the relative positions of the parts when the shoe carrying arm is disconnected from the shoe operating arm on the shaft and is swung into its rearmost position;

Figure 10 is a view like Figure 8 but showing the relative positions of the parts as the shoe carrying arm approaches its full forward position for connecting it to the shoe operating arm on the shaft;

Figure 12 is a view similar to Figure 7 but showing the relative positions of the parts when the clutch trip finger is raised and the eccentric for operating the shoe operating shaft is clutched to the drive shaft therefor;

Figure 13 is a back view of the shoe supporting arm and associated parts, partly broken away and in section;

Figure 17 is a section taken substantially on line 17—17 of Figure 11;

Figure 18 is a section taken substantially on line 18—18 of Figure 3;

Figure 18a is a section taken substantially on line 18a—18a of Figure 18;

Figure 19 is a plan view of the feed board and associated parts, showing modified means for supporting the feed board;

Figure 20 is a fragmentary front view of the feed board and associated parts, showing the board supporting means of Figure 19;

Figure 21 is an end view of the feed board and the roll and the board supporting means of Figure 19;

Figure 22 is a section taken substantially on line 22—22 of Figure 19.

Figure 6:
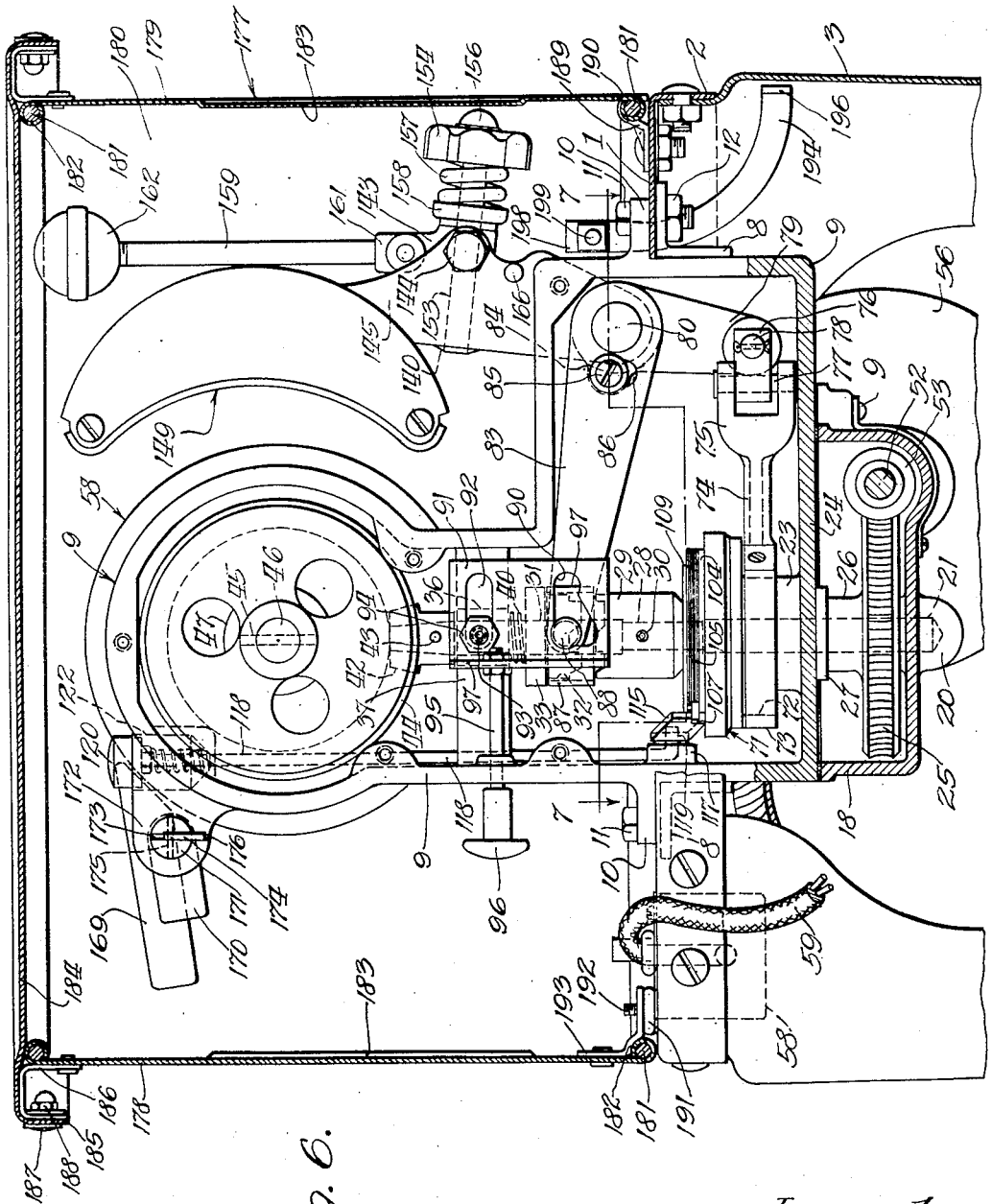
Figure 6 is a sectional view taken transversely of the machine at one end thereof, with the cover closed, the cover plate for the main gear casing being removed and the worm gear casing being shown in section, parts being broken away and parts being shown in elevation.

The machine includes a bed plate 1 having a depending peripheral flange 2 to which are secured the upper ends of supporting legs 3 in a suitable manner, as by nut and bolt means, these legs being formed of sheet metal of suitable gauge and of angle cross section. The legs 3 are disposed at the corners of the bed plate and each leg is provided, at its lower end, with a suitable mounting device or adaptor 4 which receives a caster 5 of known type. The adaptors 4 may be of any suitable type, but preferably are similar to that disclosed in my copending application for caster mounting, Serial No. 427,233, filed February 10, 1930. It is not necessary to illustrate nor describe the adaptor here in detail, it being sufficient to note that suitable means is provided for mounting the casters upon the legs. The legs are connected, a short distance above the lower ends thereof, by a spider or frame of substantially H shape, this spider comprising a central channel bar 6 and end members 7 suitably secured to the ends of this bar, the ends of the members 7 being suitably secured to the legs 3, conveniently by the same means as is employed for securing the adaptors 4 to the legs. The legs and the top plate thus constitute, in effect, a table structure which supports the ironing mechanisms and, due to the provision of the casters 5, can readily be moved from one position to another. Angle strips 8 are suitably secured to the under face of bed plate 1, as by spot welding, and extend lengthwise thereof, these strips serving to effectively reinforce the plate.

Plate 1 is provided, adjacent one end thereof, with an opening which accommodates a main gear housing 9, the lower portion of this housing fitting through the opening and between the inner vertical flanges of strips 8. Housing 9 is provided with an outwardly extending flange 10, at the ends and the inner side thereof, this flange seating upon the upper face of bed plate 1 and being secured thereto in a suitable manner, as by means of bolts 11 passing through the flange and the top plate and the upper flanges of strips 8, nuts 12 being screwed onto these bolts. The outer side of the main gear housing is closed by a lower plate 13 suitably secured thereto, as by screws 14, and by an upper plate 15 suitably secured to the housing as by means of screws 16, this upper plate being provided, at its lower end, with an inwardly offset lip 17 which engages over the upper portion of plate 13.

A worm gear housing 18 is suitably secured, as by means of screws 19, to the under face of housing 9. The housing 18 is provided with a depending boss 20 which is suitably bored from its upper end for reception of a shaft 21 rotatably mounted therein. This shaft extends upwardly through a bearing bushing 22 which fits through a collar 23 integral with and extending upwardly from bottom wall 24 of housing 9, this collar being concentric with the bore of part 20. A worm gear 25 is keyed or otherwise suitably secured upon shaft 21 and is rotatably seated upon the upper end of boss 20. Hub 26 of worm gear 25 contacts a flange 27 at the lower end of the bushing and acts to hold this bushing against downward movement. The upper portion of shaft 21 is of reduced and squared cross section, at 28, and fits into a correspondingly shaped bore in a clutch member 29 secured upon portion 28 of shaft 21 in a suitable manner, as by means of a set screw 30. The upper portion of the bore of clutch member 29 is of enlarged and circular cross section and receives the lower end of a shaft 31 upon which is slidably mounted a clutch member 32 having, at its upper end, an outer peripheral shoulder 33. This clutch member is provided with slots 34 which receive the ends of a pin 35 secured through shaft 31 and establishing driving connection between this shaft and the clutch member. Clutch members 29 and 32 are provided with cooperating teeth for establishing driving connection between shafts 21 and 31 when the upper clutch member 32 is in lowered position. Suitable means is provided for moving the clutch member 32 into and out of operative position.

At its upper portion, shaft 31 is rotatably mounted through a bearing bushing 36 which extends through a relatively thick rib 37 projecting from front wall 38 of the gear housing 9. The lower end of this bushing rests upon a cup washer 39 in which seats the upper end of an expansion coil spring 40 mounted about shaft 31, the lower end of this spring bearing upon a washer 41 disposed about the shaft 31 and seating upon the upper end of clutch member 32. This spring acts to urge the clutch member 32 downwardly into operative engagement with the lower clutch member 29. A bevel pinion 42 is suitably secured, as by means of a pin 43, on the upper end of shaft 31, which is preferably tapered, and meshes with a bevel gear 44 suitably secured, as by a pin 45, upon one end of a roll drive shaft 46. This shaft is rotatably mounted through a boss 47 formed integrally with wall 38 of housing 9. The shaft 46 extends through a tubular roll supporting member 48 which is shrunk, or otherwise suitably secured in a sleeve 49 formed integrally with wall 38 of housing 9 and projecting therefrom inwardly over the bed plate 1. Preferably, a set screw 50 screws through sleeve 49 and bears against the tubular supporting member 48 to provide supplemental means for holding this member against turning movement. The supporting member 48 extends inwardly over the bed plate to within a short distance of the other end thereof, and a ball bearing structure 51 is suitably mounted in the end of member 48 remote from housing 9. Shaft 46 extends through this structure and is supported thereby for rotation, structure 51 also serving to hold the shaft against radial displacement or distortion.

Figure 11:
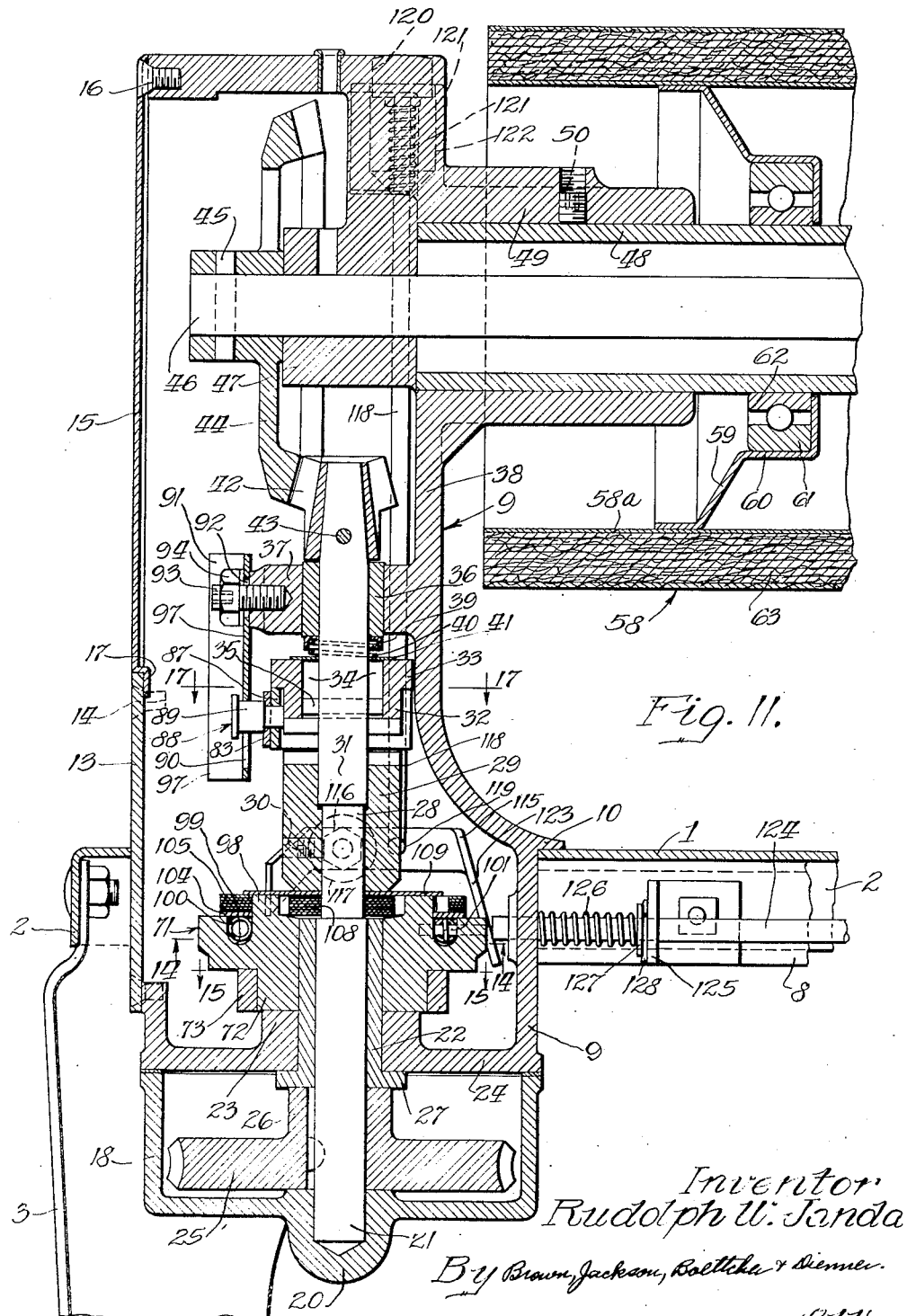
Figure 11 is a vertical sectional view through the clutch and gearing mechanisms for operating the roll and the shoe operating shaft, and associated parts.

A worm shaft 52 is rotatably mounted in the worm gear housing 18, in a suitable manner, and carries a worm 53 rigid therewith, this worm meshing with the worm wheel 25. Shaft 52 extends beyond the inner side of housing 18, beneath top plate 1, and is connected by a suitable coupling 54 to armature shaft 55 of an electric motor 56 suitably secured to and supported by a bracket 57 which is bolted or otherwise suitably secured to the lower portion of inner wall 38 of housing 9. The circuit of this motor is controlled by a switch 58 of suitable type mounted through a suitable opening in the bed plate 1. A cord 59 is provided for connecting the switch to the house circuit by means of a plug cap of known type, and suitable leads connect the switch to the motor, such leads being enclosed in protecting tubing in a known manner, and as indicated in the drawings. Upon closing of the motor circuit, worm wheel 25 is driven, thus driving the shaft 21, the direction of drive of the motor being such that this shaft is driven in a clockwise direction when viewed from above. With the clutch member 32 in its raised or inoperative position, as in Figure 11, shaft 21 and clutch member 29 rotate without effecting rotation of shaft 31. Lowering of the clutch member 32 serves to clutch shaft 31 to shaft 21, these two shafts then becoming, in effect, a single shaft which serves to drive the roll shaft 46 through the pinion 42 and bevel gear 44. Shaft 46 is thus driven, at this time, in a clockwise direction as considered in Figure 6.

Supporting member 48 provides means, in conjunction with shaft 46, for rotatably supporting a roll 58 comprising a sheet metal body 58ª of cylindrical shape, and suitably arranged reinforcing rings disposed within this body and secured thereto in a suitable manner, as by spot welding. A reinforcing ring 59 is disposed adjacent the open end of body 58ª, a short distance inwardly from sleeve 49. This ring is conveniently formed of sheet metal and is provided with a portion constituting a cup 60 within which is mounted a ball bearing structure 61 the inner member or ring 62 of which fits snugly about the tubular supporting member 48. This provides a ball bearing support for the roll adjacent sleeve 49. The cylindrical body of the roll is adapted for reception of a suitable length of fabric which may be secured to body 58ª in a suitable manner and is wrapped about the same to form a pad 63 composed of a plurality of layers of the fabric. The end portion of shaft 46 remote from housing 9 is flattened at 64 and fits through a corresponding slot 65 in a spider 66 suitably secured, as by pins 67, to a reinforcing ring 68 secured within body 58ª adjacent the inner end thereof, that is, the end of the body of the roll remote from the gear housing 9. The flattened portion 64 of shaft 46 is threaded, and spider 66 is clamped between a nut 69 at the inner face of the spider and a cap nut 70 at the outer face of the spider. The nut 69 abuts the outer face of ball bearing structure 51 and coacts with bevel gear 44 and boss 47 to hold shaft 46 against endwise movement, the two nuts 69 and 70 screwing onto the end portion 64 of shaft 46. The roll is thus mounted upon ball bearings adjacent each end thereof, and is effectively supported by the tubular member 48. When it is desired to remove the roll, this may readily be accomplished by removing cap nut 70, after which the roll may be slid lengthwise off of the shaft 46 and the supporting member 48, away from the gear housing 9. To replace the roll, this operation is reversed.

An eccentric structure 71 is mounted for free turning movement about the bearing bushing 22. This structure is provided, at its under side, with a reduced eccentric element 72 which seats upon the upper face of collar 23. An eccentric strap 73 fits about eccentric element 72. This strap is formed at one end of an arm 74 which is provided, at its other end, with a fork 75 (Figures 6 and 7). This fork receives a block 76 pivotally secured in the fork, on a vertical axis, by a pin 77. The block is also pivotally secured, by a pin 78, to the lower end of an arm 79 secured upon and depending from a shoe operating shaft 80 which is rockably mounted through a bearing sleeve 81 projecting from the inner wall of gear housing 9. (Figure 3.) This sleeve 81 extends inwardly over the bed plate and adjacent thereto and is mounted, adjacent its inner end, in a holding member 82 suitably secured to the bed plate. An arm 83 is loosely mounted upon shaft 80 adjacent the outer face of arm 79 and is connected to an ear 84 of arm 79 by means of a pin 85 secured in ear 84 and passing through a slot 86 of arm 83, this slot being concentric with shaft 80. This provides a lost motion connection between arm 83 and shaft 80 which permits of limited rocking movement of the arm independently of the shaft.

A fork 87 is pivotally secured, by a headed pin 88, to the other end of arm 83. This fork fits about clutch member 32 beneath shoulder 33 thereof. The pin 88 is provided with an enlarged body 89 which passes through a substantially triangular opening 90 in a plate 91, this plate being provided, above openings 90, with a transverse slot 92 which receives a screw pin 93 secured in rib 37, a nut 94 being screwed onto this pin at the outer face of the plate. The plate 90 is thus mounted for sliding movement, and is operated by means of a rod 95 slidable through the front wall of gear housing 9 and provided at its outer end with a knob 96, the inner end of this rod being suitably secured to an angularly disposed flange 97 at the forward end of the plate. When plate 91 is in its innermost position, as in Figure 6, pin 88 is disposed at the wider portion of opening 90 so that, upon movement of arm 83 in proper direction, the clutch member 31 is lowered into engagement with clutch member 29 thus establishing driving connection between the shaft 21 and shaft 31. As will be noted from Figure 6, opening 90 of the plate is provided with a slightly offset portion 97 adapted for reception of body 89 of pin 88 when the plate is moved into its extreme forward position, the plate then acting to hold the clutch member 32 in its raised or inoperative position, this portion 97 being of reduced width.

Eccentric member 71 is provided with an upwardly projecting flange 98 concentric with shaft 21, the upper face of this member being flat or plane from the flange to the outer edge of the body portion thereof. Member 71 is provided, in the upper place thereof and adjacent flange 98, with a channel 99 of appreciable depth, which receives a tension coil spring 100. One end of this spring is secured, by a pin 101, to member 71. At its other end, spring 100 is provided with an eye 102 which receives a tongue 103 pressed downwardly from a clutch operating ring 104 which fits about flange 98 and seats upon the upper face of eccentric member 71, this ring forming a closure for the upper end of channel 99. An annular clutch yoke 105 is disposed about flange 98 and seats upon ring 104. This yoke is provided with diametrically disposed notches 106 which receive angularly disposed tabs 107 formed integrally with the ring 104 and projecting upwardly therefrom, these tabs being outwardly offset relative to the body portion of the ring. A star wheel 108 is disposed within the pocket or recess defined by flange 98 and fits about the squared portion 28 of shaft 21 for rotation therewith. This star wheel and the yoke 105 are preferably of laminated construction, the elements thereof being suitably secured together, as by riveting. The star wheel and the yoke are thus built up from elements which can be stamped out of sheet metal of suitable gauge, which is advantageous as contributing to low cost of production. However, the yoke and the star wheel may be otherwise constructed if desired. An annular cover plate 109 is disposed beneath clutch member 29 and seats upon shoulder or flange 98, this plate projecting outwardly beyond this flange and acting to hold the yoke 105 and the star wheel 108 and cooperating parts against upward movement.

Figure 14:
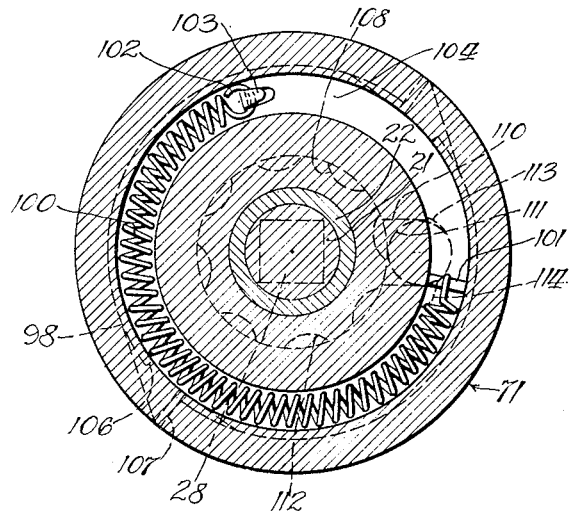
Figure 14 is a section taken substantially on line 14—14 of Figure 11.

Referring more particularly to Figures 7, 12 and 14, flange 98 is provided with a slot 110 extending therethrough and of a size to accommodate a clutch disc 111 of a size and shape to fit into the notches 112 of the star wheel 108. Clutch yoke 105 is provided, in its inner edge, with a recess 113 of proper depth to receive the portion of disc 111 which projects beyond flange 98 when this disc is in its outer or inoperative position. This recess is provided with an extension 114 of reduced depth to accommodate the outer portion of the disc 111 when the latter is in its inner or operative position. The spring 100 urges ring 104 in a clockwise direction, as considered in Figure 7.

A trip finger 115 is rockably mounted, as by means of a cap screw 116, upon a boss 117 projecting inwardly from the front wall of gear housing 9. A control rod 118 is slidably mounted in the top of housing 9 and is pivotally connected at its lower end, at 119, to finger 115. A button 120 is suitably secured upon the upper end of this rod, and an expansion coil spring 121 is mounted about rod 118 and is confined between this button and the bottom of a bore 122 provided in housing 9 to accommodate the button. Finger 115 is provided, at the inner end thereof, with an element 123 disposed for contact by a supplemental control rod 124 slidable through a bracket 125 suitably secured to one of the angle strips 8. An expansion coil spring 126 is mounted about rod 124 and is confined between the inner wall of housing 9 and a washer 127 mounted about rod 124 and held against relative movement thereto toward bracket 125 by a cotter pin 128. The rod 124 is pivotally connected, at its other end, to a lever 129 pivoted intermediate its ends, at 130, upon a bracket 131 suitably secured to angle strip 8. The forward portion of lever 129 is bent downwardly at right angles and is then bent into a loop which carries a cushion member 132 conveniently formed of soft rubber, though any other suitable material may be employed. This lever is so disposed as to be operated with facility by the left knee of an operator seated at the machine. Upon movement of the outer end of the lever 129 toward the adjacent end of the machine, rod 124 is moved inwardly of the housing 9 and serves to rock finger 115 so as to raise the other end thereof into inoperative position. The same result is accomplished by depressing button 120. The spring 126 serves to normally hold rod 124 in its outer or inoperative position, and the finger 115 is normally held in its operative position. In such position, the rearward or inner end of the finger is disposed to contact tabs 107 of the ring 104. This serves to hold yoke 105 in such position that recess 113 thereof is in alignment with slot 110, due to contact of tabs 107 with the end walls of notches 106. At this time the disc 111 is in its outer or inoperative position, and the star wheel 108 is free to turn with shaft 21 independently of the eccentric member 71 and other parts associated therewith. At this time, the spring 100 is under tension and tends to move the ring 104 in a clockwise direction, as viewed from above. In Figure 7, the shoe operating shaft 80 has been rocked in a clockwise direction, as considered in Figure 6, into its extreme position, the eccentric member being at this time disposed in its extreme position to the left of shaft 21 and being on dead center with this shaft and pin 77. This provides an eccentric lock which serves effectively to hold the shaft 80 in rocked adjustment. When it is desired to rock the shaft in the other direction, finger 115 is raised into inoperative position, through the medium of shaft 118 or shaft 124, as the case may be, thus releasing the ring 104. Spring 100 immediately turns the ring in a clockwise direction so as to bring the tabs 107 into contact with the ends of the notches 106 opposite to the ends thereof with which these tabs contact in Figure 7, the spring then acting to turn both the ring 104 and the clutch yoke 105 in a clockwise direction. This movement of yoke 105 moves the disc 111 inwardly into engagement with star wheel 108 and, the shaft 21 being driven, clutches the eccentric member to the star wheel for rotation therewith. This movement of the yoke 105 serves to first move the disc 111 inwardly, after which the reduced portion 114 of recess 113 is brought into position to fit about the outer portion of disc 111 thus holding it in its inner or operative position. The eccentric member turns with the star wheel through a half rotation, at which time the other tab 107 of ring 104 contacts trip finger 115, it being understood that this trip finger is returned to its operative position by spring 121 immediately upon release of rod 118 or rod 124, as the case may be. Upon contact of the tab 107 with the trip finger, ring 104 is held against turning movement, yoke 105 continuing to turn with the star wheel until the end walls of notches 106 contact the tabs, at which time the yoke also is held against turning movement. Upon continued turning of the star wheel and the eccentric member, slot 110 is again brought into alignment with recess 113, at which time disc 111 is forced outwardly into this recess, by the pressure exerted upon this disc by the star wheel. This returns the parts to their relative positions of Figure 7, except that the disc 111 and associated parts will have been moved through an arc of 180° from the position of this figure, and the eccentric element will have been turned through an arc of 180° so as to be disposed to the right of shaft 21, as considered in Figure 7, at which time the shoe operating shaft 80 has been rocked into its extreme position in a counterclockwise direction as considered in Figure 6. At this time, the eccentric element is again on dead center with the shaft 21 and pin 77 providing an effective locking means for holding shaft 80 in its rocked position.

Figure 15:
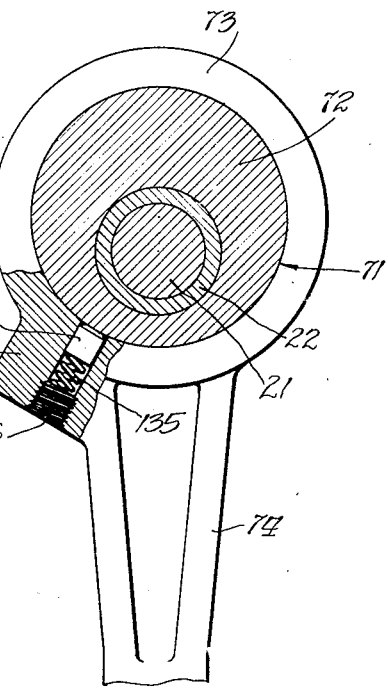
Figure 15 is a section taken substantially on line 15—15 of Figure 11 with the eccentric strap partly broken away and in section.
Figure 16:
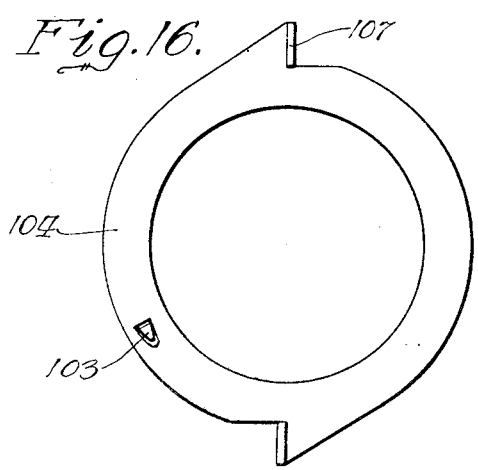
Figure 16 is a plan view of the clutch operating ring.

Preferably, I provide suitable means for preventing any undesirable looseness between the eccentric element 72 and the strap 73. As shown more clearly in Figure 15, I provide a web element or lug 133 at the juncture between the strap and arm 74. This lug is bored out for reception of a plunger 134 which bears against the eccentric element, this plunger being urged inwardly by an expansion coil spring 135 confined between the plunger and the adjusting screw 136 threaded into the bore from the outer end thereof. This plunger and associated parts for holding the strap against undesirable looseness relative to the eccentric element constitute the subject matter of my copending application for eccentric structure, Serial No. 413,306, filed December 11, 1929, and need not be further illustrated nor described here.

An arm 137 is suitably secured, as by means of a pin 138, upon shaft 80 adjacent the holding member 82. This arm extends upwardly from the shaft and is bifurcated at its upper end for reception of a reduced neck 139 extending rearwardly from a head 140 which is secured upon the forward end of an adjusting rod 153. Neck 139 abuts a head 141 at the forward end of a thimble 142, which is also mounted upon the rod 153. This thimble screws through a cruciform member 143 rockably mounted on a horizontal axis, by means of dog pointed screws 144, in a shoe carrying arm 145. This arm is bifurcated at its lower end, which straddles arm 137 and is loosely mounted upon shaft 80. At its upper end arm 145 is pivotally connected, by means of a pin 146, between two flanges 147 of a bracket plate 148 which is suitably secured to a shoe 149 which coacts with the ironing roll. This shoe has a concaved forward face to fit about the roll, when the shoe is in its forward position, and is provided with suitable heating means, preferably electrical means which may be connected to the control switch 58 by suitable leads, in a known manner, this switch controlling the circuit of both the motor and the heating element of the shoe. This heating element is indicated at 150 in Figure 8. The plate 148 may be secured to the front plate 151 of the shoe in a suitable manner and is shown (Figure 13) as provided with suitably disposed openings 152 for reception of bolts 152a. These bolts pass through a plate 148a suitably secured to front plate 151 of the shoe. The shoe may be of any suitable or preferred construction, and need not be described in detail, it being sufficient to note that a suitable shoe is provided for cooperation with the roll and this shoe is pivotally mounted upon the upper end of the shoe supporting arm 145.

A pin 153a is secured through rod 153, and the ends of this pin project into grooves 142a in the inner face of member 142. This member is thus connected to rod 153 to turn therewith but has endwise movement relative to the rod. Conveniently, a knob 154 screws upon a reduced threaded portion 155 of rod 153 and is clamped between the end of the body portion of the rod and a cap nut 156 screwed upon element or portion 155. Knob 154 is thus secured rigidly to rod 153 for rotating the latter. The forward face of knob 154 is recessed and receives one end of an expansion coil spring 157 the other end of which seats in a cup washer 158 mounted about the rod and abutting the rearward end of member 142.

A rod 159 is suitably secured, as by means of a set screw 160, in the upper arm 161 of member 143. This rod extends upwardly and is provided at its upper end with a knob 162 secured thereon and disposed so as to be readily accessible from in front of the machine.

The lower arm 163 of member 143 is bifurcated for reception of a bell crank 164 pivotally mounted in arm 163 on a pin 165. A pin 166 is secured in the shoe-supporting arm 145, adjacent the lower end thereof, and beneath the bell crank 164, this pin 166 extending across an opening provided in the arm to accommodate the bell crank. The rearward end of the rear arm of the bell crank 164 is cut away, at its outer end, to provide a shoulder 167. When the shoe supporting arm is coupled to arm 137, as in Figure 8, the bell crank 164 straddles pin 166, as shown. With the arms 145 and 137 coupled together, as illustrated, when shaft 80 is rocked in a counterclockwise direction as viewed in Figure 8, arm 137 acts through head 140 and rod 153 and associated parts to swing the shoe supporting arm forwardly thus bringing the shoe into contact with the roll. After this occurs arm 137 moves forwardly a short distance, placing spring 157 under compression so that the shoe is held against the roll by spring pressure. By rotating rod 153, thimble 142 can be adjusted through member 158. By adjusting thimble 142 toward arm 137, the shoe supporting arm is adjusted rearwardly away from the roll, since head 141 contacts the rearward face of the upper bifurcated end of arm 137. As a result, when the shoe is moved into operative relation to the roll, the pressure applied to the shoe arm, and consequently to the shoe, through spring 157, is comparatively light. On the other hand, by turning the rod 153 in the reverse direction so as to adjust thimble 142 away from arm 137, the shoe supporting arm is moved toward the roll so that, when the shoe is moved into operative relation to the roll it will be subjected to comparatively great pressure by the spring 157. This provides convenient means whereby the spring pressure to which the shoe is subjected can be varied within considerable limits, so as to accommodate the articles being ironed, which is a decided advantage. It will be noted that the means for varying the spring pressure to which the shoe is subjected is incorporated in the means for coupling the shoe supporting arm to the arm 137 so that the structure, as a whole, is comparatively simple and inexpensive.

By swinging the release rod or lever 159 rearwardly, member 143 is turned in a clockwise direction as considered in Figure 8 so as to disengage head 140 and neck 139 from the arm 137 and swing head 140 upwardly and rearwardly into contact with arm 145, thus swinging this arm rearwardly into the position of Figure 9. This rearward movement of arm 145 is limited by a stop element 82a formed integrally with holding member 82 and projecting into the path of movement of arm 145. When member 143 is swung into this position, bell crank 164 is elevated and the rearward arm thereof swings downwardly, being heavier than the forward arm, so that the shoulder 167 is disposed above and adjacent the pin 166. If now the lever 159 is pulled forwardly, shoulder 167 contacts pin 166 thus causing forward movement of the shoe supporting arm. As this arm approaches its forwardmost position relative to arm 137, the forward arm of bell crank 164 contacts the rearward face of arm 137 thus swinging the bell crank on pin 165 so as to disengage shoulder 167 from pin 166. In the continued forward movement of lever 159, head 140 contacts the forward face of the upper end of arm 137 and neck 139 passes into the slot or bifurcation thereof, coupling the arms together as in Figure 8. In Figure 10, the position of the parts as arm 145 approaches its forward position and the forward arm of bell crank 164 contacts arm 137 are shown. The lever 159 and associated parts provide quick release means for moving the shoe away from the roll when required. By moving the shoe supporting arm into its rearmost position, ready access is had to the ironing surface of the shoe for cleaning and polishing the same, as well as to the shoe structure for replacement or repair of parts.

In the normal operation of the machine, plate 91 is in its rearward position illustrated in Figure 6. When the shoe is in its open or inoperative position, pin 85 contacts the wall at the upper end of slot 86 so as to hold arm 83 in raised position thus preventing downward movement of clutch member 32. The shafts 21 and 31 are thus declutched so that the roll is not rotated when the shoe is out of operative relation thereto. Upon movement of the shoe into operative relation to the roll, shaft 80 is rocked in a counterclockwise direction as considered in Figure 6 and spring 40 acts to lower clutch member 32 into operative position, the action of the spring being supplemented by gravity. As a result, when the shoe is moved into operative relation to the roll, the shafts 21 and 31 are clutched together and the roll is driven. In certain instances, as when pressing suits or like articles, it may be desired to hold the roll against rotation, the pressing being accomplished by movement of the shoe toward and away from the roll. By moving the plate 91 into its forward position, the reduced portion 97 of opening 90 of this plate is disposed to receive the body 89 of pin 88 thus holding the clutch member 32 in raised or inoperative position. By operating either of the rods 118 or 124 for raising the trip finger 115, the eccentric member 71 may be alternately clutched to and declutched from the shaft 21, in the manner previously described, for moving the shoe toward and away from the roll.

To facilitate delivery of the articles to be ironed to the roll, I provide a feed board 169 which, in its operative position, is disposed at a slight inclination forwardly and downwardly of the machine and extends parallel to the roll adjacent the upper portion thereof, the rearward edge of this board being beveled and disposed adjacent the periphery of the roll. A supporting plate 170 is suitably secured to one end of the board and is provided with a stud 171 of circular cross section which fits into a corresponding bore through an ear 172 projecting forwardly from the upper portion of the gear housing 9. This stud is provided with a diametrical slot 173 in which a disc 174 is eccentrically pivoted by a pin 175. Ear 172 is also provided with a slot 176 adapted to receive the edge portion of the disc, this disc corresponding in diameter to the stud 171. When the board 169 is in operative position, disc 174 engages into slot 176 so as to hold the board against turning movement. By exerting pressure upon the board endwise thereof and away from ear 172, the stud 171 and the disc 174 may readily be withdrawn from the ear so as to detach the board therefrom. If desired, by raising the disc out of engagement with slot 176, the board may be turned downwardly on the axis of stud 171 so as to be disposed vertically, or substantially so, to facilitate opening and closing of a cover for the ironing mechanism.

When the ironing machine is not in use, the roll and shoe and associated parts are enclosed by a box like cover 177. This cover includes front and back walls 178 and 179, respectively, and end walls 180, all formed of sheet metal of suitable gauge. A reinforcing element, in the form of a steel rod 181 extends about the front and back and end walls of the body of the cover, adjacent the upper and the lower edges thereof, these walls being beaded over this element at 182. Also, if desired, the front and the back walls of the cover body may be pressed inwardly to provide inwardly offset panel elements 183 for increasing the rigidity of these walls as well as enhancing the appearance thereof. The cover is provided with an enameled table top 184 which extends outwardly beyond the ends and front and back of the body of the cover, and is provided with a depending peripheral flange 185. Suitably disposed brackets 186 are riveted or otherwise suitably secured to the walls of the body of the cover. Flange 185 is secured to these brackets by screws 187 which pass through this flange and the outer arms of the brackets, cap nuts 188 being threaded upon the inner ends of these screws. This provides convenient means for detachably securing the table top to the body of the cover and the brackets 186 cooperate with flange 185 for imparting desirable rigidity to the upper portion of the cover structure.

Hinge clips 189 are bolted or otherwise suitably secured to bed plate 1 adjacent each end of the back thereof. These clips engage over the lower reinforcing element 181, the bead 182 being cut away at such points and the back wall 179 being slotted at 190 to accommodate the clip. The cover is thus hinged to the bed plate on an axial parallel with and adjacent the rear edge thereof, so as to be swung into and out of position to cover the roll and shoe and associated parts. For cushioning closing of the cover, I provide bumpers 191 of felt or other suitable material provided with screw stems 192 which thread through the lower arms of brackets 193 riveted or otherwise suitably secured to front wall 178 of the cover body. These bumpers are adjusted so as to extend slightly below the cover and prevent contact thereof with the bed plate 1.

A stop member 194 is bolted or otherwise suitably secured to each end wall 183 of the cover body, adjacent the rear thereof. This stop member is of arcuate shape and passes downwardly through a slot 195 through bed plate 1. At its lower end, the stop member is provided with an angularly disposed finger 196 which, when the cover is in full open position, contacts the under face of plate 1, these stop members serving to limit opening movement of the cover and to hold it in open position with the front and the rear walls thereof disposed horizontally. The stop member 194 is bent outwardly adjacent its upper end, at 197, and is then upwardly to provide a finger or extension 198 which seats flat against the inner face of the end wall of the cover, and a securing screw 199 passes through wall 180 and extension 198, a suitable nut being threaded upon the inner end of this screw. It will be noted that the bend or element 197 seats snugly upon bead 182 and cooperates therewith to prevent turning of the stop member on the screw.

In Figures 19 to 22 I have shown modified means for supporting the feed board 169. A lock member 200 is slidably mounted in slot 173 of stud 171, by a pin and slot connection 201. When board 169 is in operative position, member 200 projects below stud 171, as in Figure 22, and prevents withdrawal of this stud from lug 172. Member 200 corresponds in width to the diameter of stud 171 so that, by raising member 200 so as to position it within the stud, the latter can be withdrawn from lug 172 for removing the board.

A bracket 202 of approximately V-shape, is provided for holding the feed board in operative position. One arm 203 of this bracket is bent substantially at right angles to provide a finger 204 which is pivotally secured, by a suitable clip 205, to the under face of the board adjacent the outer end thereof and remote from plate 170. The other arm 206 is slightly offset at its upper end, which is pivotally secured to the under-face of the board by a clip 207. Arm 207 is also provided, at its upper end, with an angularly disposed stop finger 208.

A cup shaped abutment member 209 is suitably secured, as by a screw 210 to the inner face of wall 38 of housing 9. Member 209 is provided with a slot 211 through its peripheral wall, and is disposed for reception of the lower portion of arm 203 of the bracket when the board 169 is in operative position. In applying the board, stud 171 having been inserted through lug 172, the board is turned into the upper dotted line position of Figure 21, bracket 202 is turned so as to align arm 203 thereof with slot 211, and the board is then turned into the full line position of Figure 21 so as to cause arm 203 to enter member 209 and abut the peripheral wall thereof, as shown. In this position, the bracket coacts with member 209 to provide effective means for holding the board in operative position and brace it against downward pressure. To release the board it is again turned into the upper dotted line of Figure 21, the bracket is disengaged from member 209, and the board is then turned into the lower dotted line position of Figure 21. In this position of the board, the bracket contacts and extends beneath the roll, movement of the bracket outwardly away from the roll being limited by finger 208. The bracket thus coacts with the roll for holding the board in lowered position to permit of closing of the table top cover of the machine. It will be noted that, due to the provision of finger 208 and member 209, the bracket at no time contacts housing 9 or the bed plate of the machine, which prevents marring of the finish of the machine by the bracket.

What I claim is:

1. In an ironing machine, a roll, a shoe movable to and from the roll, a rockably mounted shoe operating shaft, an operating arm rigidly connected to the shaft for movement therewith, a rockably mounted shoe supporting arm, and quick release coupling means carried by the supporting arm and cooperating with the operating arm for coupling the arms together for causing movement of the shoe supporting arm with the operating arm, said coupling means including means for yieldingly urging the shoe toward the roll when in operative relation thereto, the yielding means being adjustable and accessible for adjustment from in rear of the shoe.

2. In an ironing machine, a roll, a rockably mounted shoe operating shaft, an operating arm rigid with the shaft for movement therewith, a shoe supporting arm rockably mounted for movement toward and away from the roll, a shoe carried by said supporting arm, and coupling means carried by the supporting arm and cooperating with the operating arm for coupling the two arms together, said coupling means including adjustable means extending rearwardly of the supporting arm for yieldingly urging the shoe toward the roll when said shoe is moved into operative relation to the roll.

3. In an ironing machine, a roll, a rockably mounted shoe operating arm, means for operating said arm, a shoe supporting arm mounted for movement to and from the roll, a rod mounted on the supporting arm for relative rocking movement on an axis extending transversely thereof and having endwise movement relative to said supporting arm, means carried by the rod and cooperating with the operating arm for coupling the shoe supporting arm thereto, the coupling means carried by the rod being moved into and out of operative position by the rocking movement of said rod, and means yieldingly resisting endwise movement of the rod in a direction to move the shoe to the roll.

4. In an ironing machine, a roll, a rockably mounted shoe operating shaft, a shoe operating arm rigid with the shaft, a shoe supporting arm loose on the shaft, a shoe carried by the supporting arm for movement therewith to and from the roll, a coupling rod mounted on the supporting arm for endwise adjustment relative thereto and having means cooperating with the operating arm for coupling the supporting arm thereto, and means yieldingly resisting endwise movement of the rod through the supporting arm in a direction to move the shoe to the roll, said rod being readily accessible for adjustment from the rear of the shoe and the yielding means being adjusted by endwise adjustment of the rod.

5. In an ironing machine, a roll, a rockably mounted shoe operating shaft, a shoe operating arm rigid with the shaft, a shoe supporting arm loose on the shaft, a shoe carried by the supporting arm for movement therewith to and from the roll, a member mounted on the shoe supporting arm for rocking movement on an axis extending transversely of said supporting arm and disposed in rear of the operating arm, a rod adjustable through said member and accessible from in rear of the shoe, means yieldingly resisting endwise movement of the rod toward the operating arm, and means for coupling said rod to and uncoupling it from the operating arm by rocking movement of said member in appropriate direction.

6. In an ironing machine, a roll, a rockably mounted shoe operating shaft, a shoe operating arm rigid with the shaft, a shoe supporting arm loose on the shaft, a shoe carried by the supporting arm for movement therewith to and from the roll, a member mounted on the shoe supporting arm for rocking movement on an axis extending transversely of said supporting arm and disposed in rear of the operating arm, a rod slidable through said member and accessible from in rear of said shoe, means yieldingly resisting endwise movement of the rod toward the operating arm, means for coupling said rod to and uncoupling it from the operating arm by rocking movement of said member in appropriate direction, and means for adjusting the rod through said member.

7. In an ironing machine, a roll, a rockably mounted shoe operating shaft, a shoe operating arm rigid with the shaft, a shoe supporting arm loose on the shaft, a shoe carried by the supporting arm for movement therewith to and from the roll, a member mounted on the shoe supporting arm for rocking movement on an axis extending transversely of said supporting arm and disposed in rear of the operating arm, a thimble screwing through said member, a rod slidable through the thimble and held against turning movement relative thereto, an abutment member secured on the rearward end of the rod, an expansion coil spring mounted about the rod and confined between the thimble and said abutment member, and means for coupling the forward end of the rod to and uncoupling it from the operating arm by appropriate movement of said rocking member.

8. In an ironing machine, a roll, a rockably mounted shoe operating shaft, a shoe operating arm rigid with the shaft, a shoe supporting arm loose on the shaft, a shoe carried by the supporting arm for movement therewith to and from the roll, a member mounted on the shoe supporting arm in rear of the coupling arm, a thimble screwing through said member, a rod slidable through the thimble and held against turning movement relative thereto, an abutment member secured on the rearward end of the rod, an expansion coil spring mounted about the rod and confined between the thimble and said abutment member, and means for coupling the forward end of the rod to the operating arm.

9. In an ironing machine, a roll, a rockably mounted shoe operating shaft, a shoe operating arm rigid with the shaft and bifurcated at its upper end, a shoe supporting arm loose on the shaft, a shoe carried by the supporting arm and movable therewith to and from the roll, a member rockably mounted on the supporting arm on an axis extending transversely thereof and disposed in rear of the operating arm, a rod slidable through said member and provided with means cooperating with the bifurcated upper end of the operating arm for coupling said rod to and uncoupling it from said operating arm by rocking movement of said member toward and away from the operating arm, and means yieldingly resisting endwise movement of the rod toward the operating arm.

10. In an ironing machine, a roll, a rockably mounted shoe operating shaft, a shoe operating arm rigid with the shaft and bifurcated at its upper end, a shoe supporting arm loose on the shaft, a shoe carried by the supporting arm and movable therewith to and from the roll, a member rockably mounted on the supporting arm on an axis extending transversely of said supporting arm and disposed in rear of the operating arm, a thimble screwing through said member, a rod slidable through said thimble and held against turning movement relative thereto, an abutment member secured on the rearward end of the rod, an expansion coil spring disposed about the rod and confined between the thimble and said abutment member, and means carried by the rod and cooperating with the bifurcated end of the operating arm for coupling it to and uncoupling it from said operating arm by rocking movement of said rockably mounted member toward and away from the operating arm.

11. In an ironing machine, a roll, a shoe operating shaft, an operating arm rigid with the shaft, a shoe supporting arm loose on the shaft and movable to and from the roll, a shoe carried by said supporting arm, a member mounted on the supporting arm for rocking movement on an axis extending transversely of said supporting arm, and means carried by said member and cooperating with the operating arm for coupling the rockable member to and uncoupling it from the operating arm by rocking of said member toward and away from said operating arm, said means including means yieldingly resisting movement of the supporting arm to the roll beyond a predetermined extent.

12. In combination, a rockably mounted shaft, an operating arm rigid with the shaft, a supporting arm loose on the shaft, means for coupling the supporting arm to and uncoupling it from the operating arm, said means including a member mounted on the supporting arm for relative rocking movement on an axis extending transversely of said supporting arm, and means holding said member against rocking movement relative to the supporting arm in coupling direction when the rockably mounted member has been swung into uncoupling position and for releasing said member from the supporting arm as said member approaches coupling position.

13. In combination, a rockably mounted shaft, an operating arm rigid with the shaft, a supporting arm loose on the shaft and rockable thereon toward and away from the operating arm, a member rockably mounted on the operating arm for relative movement on an axis extending transversely thereof, means carried by said member and cooperating with the operating arm for coupling the supporting arm to and uncoupling it from the operating arm in the movement of the rockably mounted member toward and away from the operating arm, said coupling means including an element disposed to contact with the supporting arm and cause movement thereof with the rockably mounted member when said member has been rocked a predetermined distance in uncoupling direction, and means for connecting the supporting arm to said member for movement therewith toward the operating arm when the rockably mounted member is in its uncoupling position and for releasing said member from the supporting arm as the latter approaches the limit of its movement toward the operating arm.

14. In combination, a rockably mounted shaft, an operating arm rigid with the shaft, a supporting arm loose on the shaft and rockable thereon toward and away from the operating arm, a member rockably mounted on the operating arm for relative movement on an axis extending transversely thereof, means carried by said member and cooperating with the operating arm for coupling the supporting arm to and uncoupling it from the operating arm in the movement of the rockably mounted member toward and away from the operating arm, said coupling means including an element disposed to contact the supporting arm and cause movement thereof with the rockably mounted member when said member has been rocked a predetermined distance in uncoupling direction, a bell crank pivotally mounted on said member on an axis parallel to and below the axis of rocking movement thereof, and an abutment member beneath the bell crank and rigid with the supporting arm, the arm of the bell crank remote from the operating arm being urged downwardly and having an element disposed to contact said abutment member when the rockably mounted member is in uncoupling position so as to cause movement of the supporting arm with said rockably mounted member toward the operating arm, the other arm of the bell crank being disposed to contact the operating arm and thereby cause turning movement of the bell crank and disengage said element of the bell crank from said abutment member as the supporting arm approaches the limit of its movement toward the operating arm.

15. In an ironing machine, a roll, a lug adjacent one end of the roll, a feed board, a stud secured to the board and insertible through the lug, and means cooperating with the stud and the lug for holding the board against turning movement and in operative relation to the roll.

16. In an ironing machine, a roll, a lug adjacent one end of the roll, a feed board, a stud secured to the board and insertible through the lug, a bracket pivoted to the under face of the feed board on an axis eccentric to the stud, and an abutment member coacting with the bracket for holding the board against turning movement and in operative relation to the roll.

17. In an ironing machine, a roll, a lug adjacent one end of the roll, a feed board, a stud secured to the board and insertible through the lug, and turnable therein on an axis parallel to the roll, a bracket pivoted to the under face of the board on an axis extending lengthwise thereof and eccentric to the stud, an abutment member coacting with the bracket for holding the board against turning movement and in operative relation to the roll, and means limiting movement of the bracket outwardly away from the roll.

18. In an ironing machine, a housing, a roll extending from the housing, a lug on the housing, a feed board adjacent and extending along the roll, a stud secured to the board and mounted in the lug to turn on an axis parallel to the axis of the roll, a bracket pivoted to the under face of the board on an axis extending lengthwise thereof and eccentric to the stud axis, an abutment member mounted on the housing and disposed to receive the bracket, and means limiting movement of the bracket outwardly away from the roll.

19. In an ironing machine, a roll, a rockably mounted shoe operating shaft, an operating arm rigid with the shaft for movement therewith, a shoe supporting arm rockably mounted for movement toward and away from the roll, a shoe carried by said supporting arm, and coupling means for coupling the two arms together, said coupling means including adjustable means for yieldingly urging the shoe toward the roll when said shoe is moved into operative relation to the roll, said adjustable means being readily accessible for adjustment from in rear of the shoe.

In witness whereof, I hereunto subscribe my name this 20th day of September, 1930.

RUDOLPH W. JANDA.